United States Patent
Zhang et al.

(10) Patent No.: US 11,135,554 B2
(45) Date of Patent: Oct. 5, 2021

(54) MULTILAYER ARTICLES INCLUDING COATINGS CONTAINING METAL ON MICROFILTRATION MEMBRANE SUBSTRATES

(71) Applicant: 3M INNOVATIVE PROPERTIES COMPANY, St. Paul, MN (US)

(72) Inventors: Chunjie Zhang, Shoreview, MN (US); Ta-Hua Yu, Woodbury, MN (US); Hongying Jiang, Woodbury, MN (US); Xuan Jiang, Shanghai (CN); Kevin M. Casey, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 16/492,207

(22) PCT Filed: Mar. 7, 2018

(86) PCT No.: PCT/US2018/021245
§ 371 (c)(1),
(2) Date: Sep. 9, 2019

(87) PCT Pub. No.: WO2018/169737
PCT Pub. Date: Sep. 20, 2018

(65) Prior Publication Data
US 2020/0001249 A1    Jan. 2, 2020

Related U.S. Application Data

(60) Provisional application No. 62/471,516, filed on Mar. 15, 2017.

(51) Int. Cl.
*B01D 69/12* (2006.01)
*B01D 69/14* (2006.01)
(Continued)

(52) U.S. Cl.
CPC ........ *B01D 69/12* (2013.01); *B01D 67/0079* (2013.01); *B01D 67/0088* (2013.01);
(Continued)

(58) Field of Classification Search
CPC  B01D 71/022; B01D 71/024; B01D 67/0079; B01D 67/0088; B01D 69/12;
(Continued)

(56) References Cited

U.S. PATENT DOCUMENTS 4,338,194 A    7/1982  Tanny
4,539,256 A    9/1985  Shipman
(Continued)

FOREIGN PATENT DOCUMENTS

CN    103861468    6/2014
CN    105561803    5/2016
(Continued)

OTHER PUBLICATIONS

Bragg, "The Form Birefringence of Macromolecules", Acta Crystallographica, Nov. 1953, vol. 6, No. 11-12, pp. 865-867.
(Continued)

*Primary Examiner* — John Kim
(74) *Attorney, Agent, or Firm* — Adrian L. Pishko

(57) ABSTRACT

The present disclosure provides a multilayer article. The multilayer article includes a) a microfiltration membrane substrate, the microfiltration membrane substrate having a first major surface; and b) a first layer having a first major surface and a second major surface disposed opposite the first major surface. The first major surface of the first layer is directly attached to the first major surface of the microfiltration membrane substrate. The first layer includes a first polymeric binder and a plurality of acid-sintered interconnected first silica nanoparticles arranged to form a continuous three-dimensional porous network. The multilayer
(Continued)

article further includes c) a second layer attached to the second major surface of the first layer. The second layer includes i) a metal coating or ii) a composite coating comprising a second polymeric binder and at least one of metal nanoparticles or metal nanowires.

13 Claims, 3 Drawing Sheets

(51) Int. Cl.
| | |
|---|---|
| B01D 67/00 | (2006.01) |
| B01D 71/02 | (2006.01) |
| B01J 20/32 | (2006.01) |
| B01J 20/28 | (2006.01) |
| B01J 20/10 | (2006.01) |

(52) U.S. Cl.
CPC ......... *B01D 69/148* (2013.01); *B01D 71/022* (2013.01); *B01D 71/024* (2013.01); *B01J 20/103* (2013.01); *B01J 20/2803* (2013.01); *B01J 20/28007* (2013.01); *B01J 20/28035* (2013.01); *B01J 20/3234* (2013.01); *B01J 20/3268* (2013.01); *B01J 20/3295* (2013.01); *B01D 2325/10* (2013.01); *B01D 2325/48* (2013.01)

(58) Field of Classification Search
CPC .... B01D 69/148; B01D 71/025; B01D 71/68; B01D 2325/10; B01D 2325/48; B01J 20/103; B01J 20/28007; B01J 20/28035; B01J 20/2803; B01J 20/3234; B01J 20/3268; B01J 20/3295
See application file for complete search history.

(56) References Cited

U.S. PATENT DOCUMENTS

| | | |
|---|---|---|
| 4,567,221 A | 1/1986 | Maruyama |
| 4,726,989 A | 2/1988 | Mrozinski |
| 4,865,739 A | 9/1989 | Bauer |
| 5,120,594 A | 6/1992 | Mrozinski |
| 5,221,497 A | 6/1993 | Watanabe |
| 5,238,623 A | 8/1993 | Mrozinski |
| 5,993,954 A | 11/1999 | Radovanovic |
| 6,040,053 A | 3/2000 | Scholz |
| 6,632,850 B2 | 10/2003 | Hughes |
| 7,112,237 B2 | 9/2006 | Zeller |
| 7,329,311 B2 | 2/2008 | Zeller |
| 7,534,287 B2 | 5/2009 | Zeller |
| 7,723,424 B2 | 5/2010 | Hashemzadeh |
| 9,533,935 B2 | 1/2017 | Colby |
| 2006/0194037 A1 | 8/2006 | Fink |
| 2010/0035039 A1 | 2/2010 | Jing |
| 2010/0056369 A1 | 3/2010 | Gu |
| 2010/0224555 A1 | 9/2010 | Hoek |
| 2011/0027599 A1 | 2/2011 | Hoek |
| 2011/0033694 A1 | 2/2011 | Jing |
| 2011/0139726 A1 | 6/2011 | Jin |
| 2011/0244013 A1 | 10/2011 | Mrozinski |
| 2013/0171416 A1 | 7/2013 | Diekmann |
| 2014/0322586 A1 | 10/2014 | Lee |

FOREIGN PATENT DOCUMENTS

| | | |
|---|---|---|
| JP | 2002-338229 | 11/2002 |
| WO | WO 2004-054625 | 7/2004 |
| WO | WO 2006-098872 | 9/2006 |
| WO | WO 2011-072196 | 6/2011 |
| WO | WO 2011-139573 | 11/2011 |
| WO | WO 2012-047422 | 4/2012 |
| WO | WO 2012-060917 | 5/2012 |
| WO | WO 2012-064646 | 5/2012 |
| WO | WO 2015-157119 | 10/2015 |
| WO | WO 2016-004381 | 1/2016 |
| WO | WO 2016-131697 | 8/2016 |
| WO | WO 2017-196656 | 11/2017 |

OTHER PUBLICATIONS

Elma, "Microporous Silica Based Membranes for Desalination", Water, Sep. 2012, vol. 4, No. 3, pp. 629-649.
Li, "Effects of Thermal Efficiency in DCMD and the Preparation of Membranes with Low Thermal Conductivity", Applied Surface Science, 2014, vol. 317, pp. 338-349.
International Search Report for PCT International Application No. PCT/US2017/031253, dated Jul. 25, 2017, 5 pages.
International Search Report for PCT International Application No. PCT/US2018/021245, dated May 16, 2018, 4 pages.

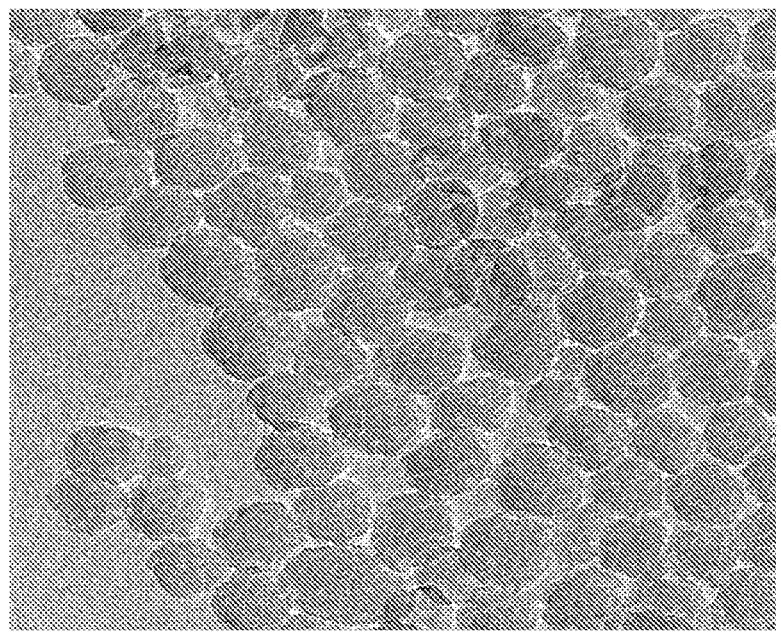
*Fig. 2A*  20nm
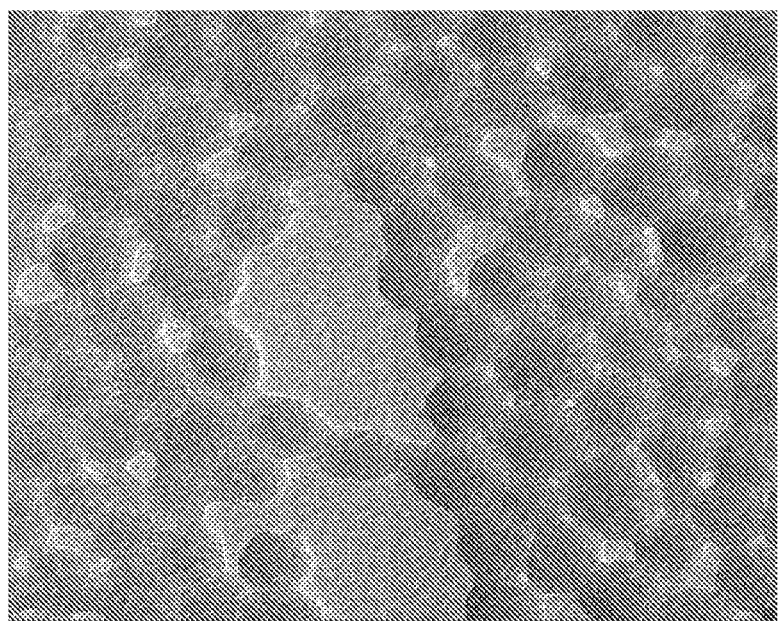
*Fig. 2B*  20nm

MULTILAYER ARTICLES INCLUDING COATINGS CONTAINING METAL ON MICROFILTRATION MEMBRANE SUBSTRATES

CROSS REFERENCE TO RELATED APPLICATIONS

This application is a national stage filing under 35 U.S.C. 371 of PCT/US2018/021245, filed Mar. 7, 2018, which claims the benefit of U.S. Application No. 62/471,516, filed Mar. 15, 2017, the disclosure of which is incorporated by reference in their entirety herein.

TECHNICAL FIELD

The present disclosure relates to porous multilayer articles and methods of making and using such materials. The multilayer articles are both microporous and nanoporous.

BACKGROUND

Microporous materials generally have pores with an effective diameter typically at least several times the mean free path of the molecules passing through them, namely from several micrometers down to as low as about 100 Angstroms (0.01 micrometers). Ultrafiltration membranes generally have pore sizes below 50 nm, and can be expensive to make due to the materials and processes typically employed. Ultrafiltration membranes are generally desired to have a high density of pores with a well-defined single pore size in the nanometer range. Such membranes are also expected to demonstrate both high permeability and high selectivity. However, a trade-off between permeability and selectivity commonly exists in current technologies.

Commercially available membranes often have limited performance primarily due to difficulties in controlling pore formation, which leads to a sparsely distributed pore size. Therefore, high permeability and high selectivity cannot readily be synchronized within the same membrane. Beyond technical challenges, high price is another prevalent hurdle for the broad application of such membranes.

SUMMARY

Briefly, the present disclosure describes exemplary embodiments of a multilayer article including both a microporous membrane and two coating layers on the microporous membrane. In some exemplary methods, these multilayer articles can be produced at relatively high rates and low cost. In certain exemplary embodiments, the microporous materials are used to produce multilayer articles with advantageous features arising from a combination of the microporous material and the multiple layers.

In a first aspect, a multilayer article is provided. The multilayer article comprises a) a microfiltration membrane substrate, the microfiltration membrane substrate having a first major surface; and b) a first layer having a first major surface and a second major surface disposed opposite the first major surface. The first major surface of the first layer is directly attached to the first major surface of the microfiltration membrane substrate. The first layer includes a first polymeric binder and a plurality of acid-sintered interconnected first silica nanoparticles arranged to form a continuous three-dimensional porous network. The multilayer article further includes c) a second layer attached to the second major surface of the first layer. The second layer includes i) a metal coating or ii) a composite coating comprising a second polymeric binder and at least one of metal nanoparticles or metal nanowires.

In a second aspect, another multilayer article is provided. The multilayer article comprises a) a microfiltration membrane substrate, the microfiltration membrane substrate having a first major surface; and b) a first layer having a first major surface and a second major surface disposed opposite the first major surface. The first major surface of the first layer is directly attached to the first major surface of the microfiltration membrane substrate. The first layer comprises a first polymeric binder and a plurality of acid-sintered interconnected first silica nanoparticles arranged to form a continuous three-dimensional porous network. The multilayer article further includes c) a second layer directly attached to the second major surface of the first layer. The second layer includes a second polymeric binder, a plurality of metal nanoparticles or metal nanowires, and a plurality of second silica nanoparticles arranged to form a continuous three-dimensional porous network.

BRIEF DESCRIPTION OF DRAWINGS

FIG. 2A is a transmission electron micrograph of a comparative example silica layer formed without acid-sintering of the silica nanoparticles.

FIG. 2B is a transmission electron micrograph of an exemplary silica layer formed using acid-sintered silica nanoparticles.

Figure 1A:
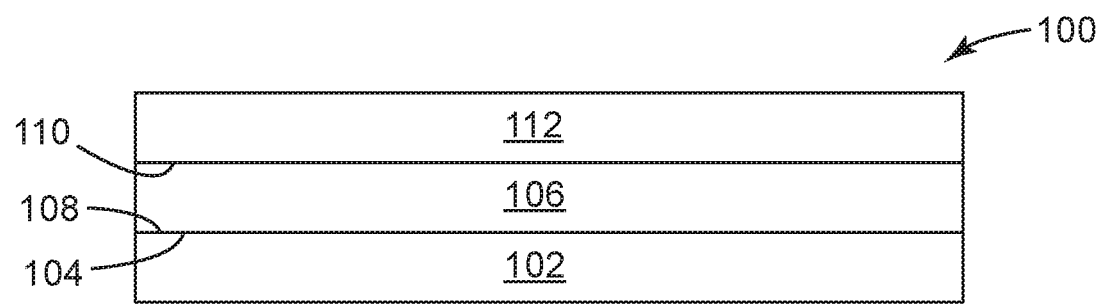
FIG. 1A is a schematic cross-sectional view of an exemplary multilayer article.

While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations.

DETAILED DESCRIPTION

Various exemplary embodiments of the disclosure will now be described, with particular reference to the Examples and the Figures. Exemplary embodiments of the disclosure may take on various modifications and alterations without departing from the spirit and scope of the disclosure. Accordingly, it is to be understood that the embodiments of the disclosure are not to be limited to the following described exemplary embodiments, but is to be controlled by the limitations set forth in the claims and any equivalents thereof.

As used throughout this specification and the appended embodiments, the words "suitable" and "preferably" refer to embodiments of the disclosure that may afford certain benefits under certain circumstances. Other embodiments may also be suitable, however, under the same or other circumstances. Furthermore, the recitation of one or more suitable embodiments does not imply that other embodiments are not useful, and is not intended to exclude other embodiments from the scope of the disclosure.

For the following Glossary of defined terms, these definitions shall be applied for the entire application, including the claims:

Glossary

The term "(co)polymer" is used herein to refer to a homo(co)polymer or a (co)polymer.

The term "microporous" is used herein to mean a material comprising a network of interconnected pores having a median diameter less than one micrometer.

The term "nanoparticle" refers to particles that are submicron in size. The nanoparticles have an average particle size, which typically refers to the average longest dimension of the particles, that is no greater than 900 nanometers, no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is often determined using transmission electron microscopy but various light scattering methods can be used as well. Nanoparticles typically have an aspect ratio of a major axis (e.g., length) to a minor axis (e.g., diameter) of 1:1 or more to less than 10:1.

The term "acid-sintered silica nanoparticles" means silica nanoparticles that have been subjected to an acid having a pKa less than 3.5, such that a dispersion of the silica nanoparticles has a pH in a range of 2 to 5. Typically, thermal sintering of silica requires temperatures of about 70% of the melting point temperature of about 1400-1700° C.; however, the acid-sintered silica nanoparticles are instead chemically sintered by the acid. Optionally, the acid-sintered silica nanoparticles are also exposed to temperatures as high as about 250° C. during drying/curing process for the article. In contrast, silica nanoparticle sols that are merely acid-stabilized do not form acid-sintered silica nanoparticles upon drying/curing of the article. The average particle size of silica nanoparticles refers to the average particle size of the primary silica nanoparticles used to form the silica network. The average particle size typically refers to the average size of non-agglomerated and/or non-aggregated and/or non-sintered single nanoparticles of silica. That is, the average particle size refers to the average particle size of the primary silica nanoparticles prior to sintering under acidic conditions.

The term "nanowire" refers to a nanostructure having a diameter in the range of 1 to 250 nanometers, and typically an aspect ratio of a major axis (e.g., length) to a minor axis (e.g., diameter) of 10 to 1 or greater.

The term "aqueous" with respect to a composition refers to the liquid carrier (e.g., solvent) of the composition comprising at least 50 weight percent water.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions. Typical hydrolyzable groups include, but are not limited to, alkoxy, aryloxy, aralkyloxy, acyloxy, or halo.

The term "alkoxy" refers to refers to a monovalent group having an oxy group bonded directly to an alkyl group.

The term "aryloxy" refers to a monovalent group having an oxy group bonded directly to an aryl group.

The term "aralkyloxy" refers to a monovalent group having an oxy group bonded directly to an aralkyl group. Equivalently, it can be considered to be an alkoxy group substituted with an aryl group.

The term "acyloxy" refers to a monovalent group of formula —O(CO)Rb where Rb is alkyl, aryl, or aralkyl. Suitable alkyl Rb groups often have 1 to 10 carbon atoms, 1 to 6 carbon atoms, or 1 to 4 carbon atoms. Suitable aryl Rb groups often have 6 to 12 carbon atoms such as, for example, phenyl. Suitable aralkyl Rb groups often have an alkyl group with 1 to 10 carbon atoms, 1 to 6 carbon atoms, or 1 to 4 carbon atoms that is substituted with an aryl having 6 to 12 carbon atoms such as, for example, phenyl.

The term "halo" refers to a halogen atom such as fluoro, bromo, iodo, or chloro.

The term "PVA" refers to poly(vinyl alcohol), derivatives thereof, and mixtures of poly(vinyl alcohol) and its derivatives. The degree of hydrolysis of PVA or its derivatives is from 50 to 100 percent, or 70 to 100 percent, or 85 to 100 percent. For example, the PVA can include up to 50 percent polyvinyl acetate.

The term "SIPS" refers to Solvent Induced Phase Separation.

The term "TIPS" refers to Thermally Induced Phase Separation.

The term "wt %" is used in accordance with its conventional industry meaning and refers to an amount based upon the total weight of solids in the referenced composition.

A number of methods for making microporous films and membranes are taught in the art. One of the most useful methods involves thermally induced phase separation. Generally such a process is based on the use of a polymer or (co)polymer that is soluble in a diluent at an elevated temperature but that is insoluble in the diluent material at a relatively lower temperature. Examples of such methods are described in U.S. Pat. Nos. 4,539,256, 4,726,989, and 5,120,594; and U.S. Application Publication No. 2011/0244013.

Articles described herein were developed and found useful for the creation of multilayer articles having a hybrid nanoparticle coating, and including a microfiltration membrane as a substrate. The articles include acid catalyzed low temperature sintered bonded nanosilica and a reactive binder polymer as well as metal nanoparticles and/or nanowires deposited on the bonded nanosilica or mixed with silica nanoparticles and a binder. Multilayer articles according to at least certain embodiments of the present disclosure exhibit high viral removal capability from fluid samples.

As disclosed above, in a first aspect a multilayer article is provided. The multilayer article comprises a) a microfiltration membrane substrate, the microfiltration membrane substrate having a first major surface; b) a first layer having a first major surface and a second major surface disposed opposite the first major surface, wherein the first major surface of the first layer is directly attached to the first major surface of the microfiltration membrane substrate, the first layer comprising a first polymeric binder and a plurality of acid-sintered interconnected first silica nanoparticles arranged to form a continuous three-dimensional porous network; and c) a second layer directly attached to the second major surface of the first layer, the second layer comprising i) a metal coating or ii) a composite coating comprising a second polymeric binder and at least one of metal nanoparticles or metal nanowires.

Referring to FIG. 1A, according to the first aspect, the multilayer article 100 includes a) a microfiltration membrane substrate 102, the microfiltration membrane substrate 102 having a first major surface 104; and b) a first layer 106 having a first major surface 108 and a second major surface 110 disposed opposite the first major surface 108. The first major surface 108 of the first layer 106 is directly attached to the first major surface 104 of the microfiltration membrane substrate 102. The first layer 106 comprises a first polymeric binder and a plurality of acid-sintered interconnected first silica nanoparticles arranged to form a continuous three-dimensional porous network. The multilayer article 100 further includes c) a second layer 112 attached to the second major surface 110 of the first layer 106. As shown in FIG. 1A, the second layer 112 is directly attached to the second major surface 110 of the first layer 106. The second layer 112 comprises i) a metal coating or ii) a composite coating comprising a second polymeric binder and at least one of metal nanoparticles or metal nanowires. In certain embodiments, the metal coating comprises a layer of at least one of copper, silver, gold, or platinum. In select embodiments copper is preferred for its antimicrobial properties.

Referring again to FIG. 1A, according to the second aspect, the multilayer article 100 includes a) a microfiltration membrane substrate 102, the microfiltration membrane substrate 102 having a first major surface 104; b) a first layer 106 having a first major surface 108 and a second major surface 110 disposed opposite the first major surface 108. The first major surface 108 of the first layer 106 is directly attached to the first major surface 104 of the microfiltration membrane substrate 102. The first layer 106 comprises a first polymeric binder and a plurality of acid-sintered interconnected first silica nanoparticles arranged to form a continuous three-dimensional porous network. The multilayer article 100 further includes c) a second layer 112 attached to the second major surface 110 of the first layer 106. As shown in FIG. 1A, the second layer 112 is directly attached to the second major surface 110 of the first layer 106. The second layer 112 comprises a second polymeric binder, a plurality of metal nanoparticles or metal nanowires, and a plurality of second silica nanoparticles arranged to form a continuous three-dimensional porous network.

The disclosure below relates to both the first aspect and the second aspect.

It has been discovered that it is possible to prepare an article (e.g., an ultrafiltration article, battery separator, etc.) that exhibits selectivity by forming a layer that includes a continuous three-dimensional porous network of acid-sintered interconnected silica nanoparticles including a polymeric binder and forming a layer comprising metal on the continuous three-dimensional porous network. The two layers are supported by a microporous material. It was unexpectedly found that the use of metal in the second layer allows microorganism removal and/or deactivation without relying solely on size exclusion of the microorganism. For instance, exemplary multilayer articles according to certain embodiments of the present disclosure can selectively reduce the amount of a bacteriophage (or other virus) in a fluid sample by at least a factor of 10, at least a factor of 100, at least a factor of 1,000, at least a factor of 10,000, at least a factor of 100,000, or even at least a factor of 1,000,000. In at least certain embodiments, exemplary multilayer articles can selectively reduce the amount of a bacteriophage (or other virus) in a fluid sample by at least a factor of 10 more, or 100 more, than can be removed by an article having a single layer of the same continuous three-dimensional porous network of acid-sintered interconnected silica nanoparticles including a polymeric binder instead of two layers, in which the second layer includes a metal as described herein.

Figure 1B:
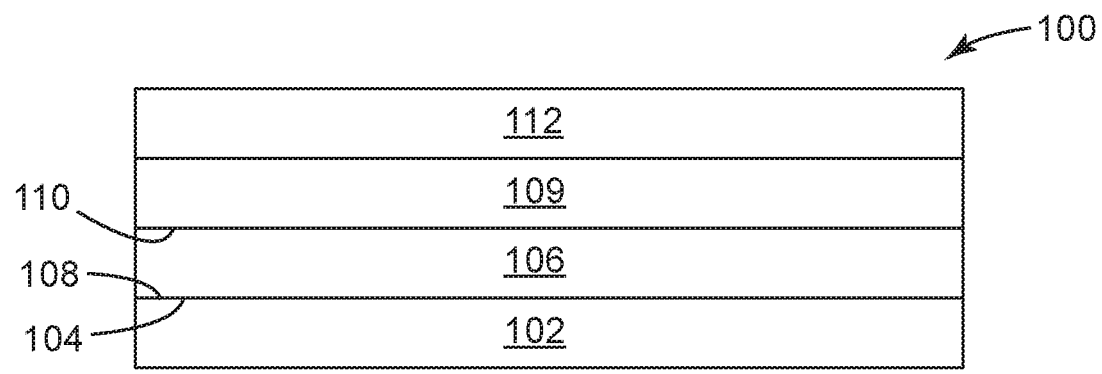
FIG. 1B is a schematic cross-sectional view of another exemplary multilayer article.

Referring to FIG. 1B, in certain embodiments, the multilayer article 100 further includes a third layer 109 disposed between the first layer 106 and the second layer 112. The third layer comprises a plurality of acid-sintered interconnected second silica nanoparticles arranged to form a continuous three-dimensional porous network. Including such a third layer comprising acid-sintered interconnected second silica nanoparticles arranged to form a continuous three-dimensional porous network can increase the log reduction value of the multilayer article, but concomitantly such a third layer typically also lowers the flux of the multilayer article.

Figure 1C:
FIG. 1C is a schematic cross-sectional view of the second layer of an exemplary multilayer article.

Referring to FIG. 1C, just the second layer 112 of the multilayer article 100 according to certain embodiments is shown. In some embodiments, the second layer 112 comprises a composite coating comprising a second polymeric binder and at least one of metal nanoparticles 113 or metal nanowires 113. In other embodiments, the second layer 112 comprises a second polymeric binder, a plurality of metal nanoparticles 113 or metal nanowires 113, and a plurality of second silica nanoparticles arranged to form a continuous three-dimensional porous network. Optionally, the second layer includes a composite coating comprising a second polymeric binder and metal nanoparticles, or a second polymeric binder and metal nanowires.

The metal nanoparticles and/or metal nanowires typically used in aspects of the present disclosure are independently selected from at least one of copper, silver, gold, titanium, cobalt, nickel, zinc, zirconium, platinum, or alloys thereof. The metal nanoparticles may be essentially pure metal (e.g., 99% or greater copper, silver, gold, titanium, cobalt, nickel, zinc, zirconium, or platinum). For instance, some suitable metal nanoparticles include copper or silver nanopowders commercially available from US Research Nanomaterials, Inc (Houston, Tex.).

In many embodiments, the metal nanoparticles have an average particle diameter of 10 nanometers or greater, 15 nanometers or greater, 20 nanometers or greater, 25 nanometers or greater, 30 nanometers or greater, 40 nanometers or greater, 50 nanometers or greater, 60 nanometers or greater, 75 nanometers or greater, 100 nanometers or greater, or even 200 nanometers or greater; and 999 nanometers or less, 900 nanometers or less, 800 nanometers or less, 700 nanometers or less, 600 nanometers or less, 500 nanometers or less, 400 nanometers or less, 300 nanometers or less, 250 nanometers or less, 150 nanometers or less, 80 nanometers or less, or even 50 nanometers or less. Stated another way, the metal nanoparticles may have an average particle diameter of between 10 nanometers and 999 nanometers, inclusive, between 10 nanometers and 600 nanometers, inclusive, or between 10 nanometers and 50 nanometers, inclusive. Similarly, in many embodiments, the metal nanowires have an average diameter of 1 nanometer or more, 2 nanometers or more, 5 nanometers or more, 10 nanometers or more, 15 nanometers or more, 25 nanometers or more, 50 nanometers or more, 75 nanometers or more, or 100 nanometers or more; and 250 nanometers or less, 200 nanometers or less, 150 nanometers or less, 125 nanometers or less, 100 nanometers or less, 80 nanometers or less, 60 nanometers or less, 40 nanometers or less, or 30 nanometers or less. The metal nanowires often have an aspect ratio of length to diameter of 10:1 or more, 50:1 or more, 75:1 or more, 100:1 or more, 150:1 or more, 250:1 or more, 500:1 or more, 700:1 or more, 1,000:1 or more, 5,000:1 or more, or 10,000:1 or more; and 100,000:1 or less, 75,000:1 or less, 50,000:1 or less, 25,000:1 or less, 15,000:1 or less, 8,000:1 or less, 4,000:1 or less, 2,000:1 or less, or 750:1 or less. One suitable metal nanowire, for example, are the silver nanowires commercially available in an ink product under the trade name CLEAROHM Silver Nanowire Ink-W from Cambrios Advanced Materials (Sunnyvale, Calif.).

In embodiments wherein the second layer comprises a metal coating, the metal coating may be formed by depositing metal nanoparticles on the first layer. The metal coating may be applied using metal deposition processes to form a coating of essentially pure (e.g., 99% or greater) metal. Suitable deposition methods are known to the skilled practitioner and include for example and without limitation, cathode sputtering, evaporation, chemical vapor deposition, atomic layer deposition, plasma deposition, pyrolysis, ion plating, e-beam deposition, and the like. Vapor deposition and cathode sputtering are often preferred in view of the uniformity of structure and thickness that can be obtained.

In some embodiments, the metal coating has an average thickness (over the area of the coating) of 5 nanometers or more, 6 nanometers or more, 7 nanometers or more, 8 nanometers or more, 9 nanometers or more, or 10 nanometers or more; and 20 nanometers or less, 18 nanometers or less, 16 nanometers or less, 14 nanometers or less, or even 12 nanometers or less. Stated another way, the metal coating typically has an average thickness of 5 nanometers to 20 nanometers, inclusive, 5 nanometers to 12 nanometers, inclusive, or 10 nanometers to 20 nanometers, inclusive. A metal layer that is too thin will provide minimal increase in LRV of the article, while a metal layer that is too thick may damage the layer beneath it. Average thickness of the metal coating may be measured during deposition using a commercially available quartz crystal microbalance. After deposition, a number of chemical assays can be used to characterize the quantity of metal in any specified area. Particle diameter (formed by agglomeration of the nanoparticles) is typically measured using light scattering techniques known in the art. Primary particle diameter is typically measured using transmission electron microscopy or atomic force microscopy.

Physical vapor deposition (PVD) processes involve the deposition of atoms, typically by evaporation or sputtering in a vacuum. PVD processes can be characterized by the steps of (1) generating a metallic vapor by evaporation or sputtering using resistance, induction, electron-beam heating, laser-beam ablation, direct current plasma generation, radio-frequency plasma generation, molecular beam epitaxy, or similar means; (2) transport of the metallic vapor from the source to the substrate by molecular flow, viscous flow, plasma gas transport, or the like; and (3) nanoparticle growth on the thermoplastic polymer film, wherein nucleation and growth of the nanoparticles occurs. With PVD a variety of substrate temperatures can be used to control the crystallization and growth mode of the material deposited, although generally the temperature of the thermoplastic polymer film is below the distortion temperature of the polymer.

In some embodiments, the metal coating is applied to the first layer (or a third layer) by electron beam evaporation. This technique is based on heat production by high-energy electron beam bombardment on the metal to be deposited. The electron beam is generated by an electron gun, which uses the thermionic emission of electrons produced by an incandescent filament (cathode). Emitted electrons are accelerated towards an anode by a high difference of potential (kilovolts). The crucible (containing the source metal) itself or a near perforated disc can act as the anode. A magnetic field is often applied to bend the electron trajectory, allowing the electron gun to be positioned below the evaporation line. As electrons can be focused, it is possible to obtain a very localized heating on the metallic material to evaporate, with a high density of evaporation power (several kW). This allows control of the evaporation rate, from low to very high values. Cooling the crucible avoids contamination problems from heating and degasification.

Physical vapor deposition by sputtering is accomplished in a partial vacuum (between 13.3 to 1.33 Pa for a diode system and between 1.3 to 0.13 Pa for a magnetron system) when the target (usually a cathode) is bombarded with gas ions propelled by an electric field. The sputtering gas is typically a noble gas such as argon but the sputtering gas could include reactive elements that can be incorporated into the deposited film such as the deposition of nitrides, oxides and carbides. When the sputtering gas is ionized a glow discharge or plasma is produced. The gas ions are accelerated towards the target by an electric or electric and magnetic fields. Atoms from the target are ejected by momentum transfer and move across the vacuum chamber to be deposited on the substrate (the thermoplastic polymer film).

In another embodiment, the metal coating is applied to the article by sputter deposition. The sputtering apparatus generally consists of a three-source magnetron sputtering system arranged around the outer circumference of a cylindrical chamber containing a 38 cm (15 inch) diameter rotating drum. The substrate is mounted on the drum and rotated sequentially past positions in front of the sputtering sources at rates of between 1 and 8 rpm. The sources are shielded such that the sample is not coated from any two fluxes at the same time. The rate of material deposition and speed of rotation of the substrate in front of the targets determines the individual layer thicknesses comprising the final catalyst particles. Any vacuum pump that can draw a sufficient vacuum may be used. One such vacuum pump is a Varian AV8 cryopump (Varian Associates, Lexington, Mass.), which can be used in conjunction with an Alcatel 2012A rotary vane-roughing pump (Alcatel Vacuum Products, Hingham, Mass.). The cryopump may be partially isolated from the chamber by a butterfly valve. During deposition pressure may be maintained at 0.28 Pa (2.1 millitorr) as the sputtering gas flow rate can be controlled by MKS flow controllers (MKS Instruments Inc., Andover, Mass.). Any inert or reactive sputtering gases may be used. Preferably either argon or an argon, oxygen mix is used. Control of the oxygen stoichiometry can be achieved by varying the argon/oxygen flow ratio. Any appropriate targets and power sources may be used. In one embodiment, an Advanced Energy MDX 500 power supply (Advanced Energy Industries, Inc., Fort Collins, Colo.) is used in the constant power mode of the power supply.

Acid-sintered nanosilica coatings have been prepared by acidifying an aqueous colloidal suspension of nanometer-scale particles to a pH of less than 5, for example 2-3. Such silica nanoparticle coatings include those, for example, described in co-owned U.S. Patent Application Publication Nos. 2011/0033694 (Jing et al.) and 2010/0035039 (Jing et al.) and in co-owned International Application Publication Nos. WO 2012/064646 (Riddle et al.), WO 2011/139573 (Pett et al.), and WO 2012/047422 (Hebrink et al.). At a pH of 2-3, the particles possess little or no net charge, and can thus aggregate and fuse. Upon drying, the particles sinter at temperatures much lower than would be required without acidification.

The term "nanoparticle" refers to particles that are sub-micron in size. The nanoparticles have an average particle size, which typically refers to the average longest dimension of the particles, that is no greater than 900 nanometers, no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is preferably determined using transmission electron microscopy but various light scattering methods can be used as well. Regarding the silica nanoparticles in layers of the present articles, the average particle size refers to the average particle size of the primary silica nanoparticles used to form the silica network. The average particle size typically refers to the average size of non-agglomerated and/or non-aggregated and/or non-sintered single nanoparticles of silica. That is, the average particle size refers to the average particle size of the primary silica nanoparticles prior to sintering under acidic conditions.

Multiple silica nanoparticles are joined together into a three dimensional network by low temperature (e.g., at or near room temperature) sintering in the presence of an acid (i.e., chemical sintering). The silica nanoparticles in the article are acid-sintered. At least some adjacent nanoparticles in the porous network tend to have bonds such as silica "necks" joining them together (see, e.g., FIG. 2B). These silica necks are typically formed by acidification of the silica nanoparticles, and are attributed to the catalytic action of strong acid in making and breaking siloxane bonds. Stated differently, at least some adjacent silica nanoparticles tend to be joined together forming a three dimensional porous network. The term "network" refers to a continuous three-dimensional structure formed by linking together silica nanoparticles. The term "continuous" means that the individual silica nanoparticles are linked over the dimension of the layer coating. The term "agglomerated" refers to multiple bonding between the silica particles which have many points of contact with one or another. As result of the necking, bonding or entanglements of the silica particles, the original particle shapes may be deformed. Transmission electron microscopy generally reveals that at least 25%, preferably at least 50% of the silica particles in the resultant coatings are directly bonded to adjacent particles. Mineral acids may be preferred, for instance to minimize steric hindrance that could be caused by the structure of an organic acid located between two adjacent silica nanoparticles.

FIG. 2A is a transmission electron micrograph of a layer of silica nanoparticles from ethanol at a basic pH. The layer is non-uniform and the individual particles are not linked to the adjacent particles. In contrast to FIG. 2A, FIG. 2B is a transmission electron micrograph of acid-sintered silica nanoparticles. Unlike chains of fumed silica particles that are simply linear chains of sintered silica nanoparticles, the acid-sintered layer is a continuous network of chemically sintered interconnected nanoparticles that can be arranged to form a three-dimensional layer. The linear chains of fumed silica are not connected together and typically form a layer by combination with a binder such as a polymeric binder. A majority of the polymeric binder (and any organic materials present in the continuous network) described herein is simply located within various pores (e.g., voids) of the interconnected network, although a minority of the polymeric binder present optionally holds some portions of the layer together. Further, chains of fumed silica particles are formed at relatively high temperatures such as at temperatures greater than 300° C., greater than 400° C., or greater than 500° C. In contrast, the acid-sintered network is formed by sintering the silica nanoparticles at relatively low temperatures such as at or near room temperature (e.g., 20-25° C.) in the presence of an acid.

The term "porous" refers to the presence of voids between the individual silica nanoparticles within the continuous silica network. Porosity may be calculated from the refractive index of the coating according to published procedures such as in W. L. Bragg, A. B. Pippard, *Acta Crystallographica*, volume 6, page 865 (1953). Porosity tends to correlate to the roughness of the surface. The porosity tends to also correlate with the hydrophilicity of the surface. That is, increased surface roughness tends to lead to increased hydrophilicity. Porosity of the surface can often be increased by using silica nanoparticles with a larger average particle size or by using a mixture of silica nanoparticles with different shapes.

Not wishing to be bound by theory, it is believed that the agglomerates of the silica nanoparticles are formed by through acid-catalyzed siloxane bonding in combination with protonated silanol groups at the particle surfaces and these agglomerates explain the coatability on hydrophobic organic surfaces, as these groups tend to be bonded, adsorbed, or otherwise durably attached to hydrophobic surfaces. Although aqueous organic solvent-based coatings of nanoparticle silica dispersions have been described, such mixtures of water and an organic solvent may suffer from differential evaporation rates that result in continuously changing composition of the liquid phase, which consequently changes the coating properties; resulting in poor uniformity and defects.

The larger the silica particles, the smaller the contact point between adjacent silica particles during formation of neck bonding, thus the larger the pores between the adjacent silica particles. Concomitantly, the smaller the particles, the larger the contact point between adjacent silica particles during formation of neck bonding, thus the smaller the pores between the adjacent silica particles. Selecting particular silica particle sizes of unimodal and/or multimodal distributions is thus one factor in the formation of a controlled pore size silica network.

The primary silica nanoparticles used to prepare acid-sintered silica networks can have any desired shape or mixture of shapes. The silica nanoparticles can be spherical or non-spherical (i.e., acicular) with any desired aspect ratio. Aspect ratio refers to the ratio of the average longest dimension of the nanoparticles to the average shortest dimension of acicular silica nanoparticles. The aspect ratio of acicular silica nanoparticles is often at least 2:1, at least 3:1, or at least 5:1. Some acicular nanoparticles are in the shape of rods, ellipsoids, needles, and the like. The shape of the nanoparticles can be regular or irregular. The porosity of the coatings can be varied by changing the amount of regular and irregular shaped nanoparticles in the composition and/or by changing the amount of spherical and acicular nanoparticles in the composition.

If the silica nanoparticles are spherical, the average diameter is often up to 500 nanometers, less than 200 nanometers, less than 100 nanometers, less than 50 nanometers, less than 40 nanometers, less than 25 nanometers, or less than 20 nanometers, or up to 20 nanometers. Some nanoparticles can have an even smaller average diameter such as less than 10 nanometers or less than 5 nanometers.

If the silica nanoparticles are acicular, they often have an average width (smallest dimension) equal to at least 1 nanometer, at least 2 nanometers, or at least 5 nanometers. The average width of acicular silica nanoparticles is often no greater than 25 nanometers, no greater than 20 nanometers, or no greater than 10 nanometers. The acicular silica nanoparticles can have an average length $D_1$ measured by dynamic light scattering methods that is, for example, at least 40 nanometers, at least 50 nanometers, at least 75 nanometers, or at least 100 nanometers. The average length $D_1$ (e.g., longer dimension) can be up to 200 nanometers, up to 400 nanometers, or up to 500 nanometers. The acicular colloidal silica particles may have degree of elongation $D_1/D_2$ in a range of 5 to 30, wherein $D_2$ means a diameter in nanometers calculated by the equation $D_2=2720/S$ and S means specific surface area in meters squared per gram (m²/gram) of the nanoparticle, as described in U.S. Pat. No. 5,221,497 (Watanabe et al.).

In certain embodiments, each of the first silica nanoparticles and the second silica nanoparticles independently have an average particle size (i.e., longest dimension) that less than or equal to 500 nanometers, less than or equal to 300 nanometers, less than or equal to 250 nanometers, less than or equal to 200 nanometers, less than or equal to 100 nanometers, greater than 2 nanometers, greater than 5 nanometers, greater than 10 nanometers, greater than 25 nanometers, or greater than 50 nanometers (e.g., in the range of 2 nanometers to 250 nanometers or 100 nanometers to 250 nanometers). Various sizes and/or various shapes of particles may be used in combination.

In certain embodiments, multimodal distributions of particle sizes may be used in one or both of the first silica nanoparticles and the second silica nanoparticles. For example, nanoparticles having an average particle size of at least 100 nanometers (e.g., in the range of 110 to 250 nanometers or in the range of 100 to 150 nanometers, inclusive) can be used in combination with nanoparticles having an average diameter no greater than 90 nanometers (e.g., in the range of 1 to 90 nanometers, 5 to 90 nanometers, or 15 to 90 nanometers, inclusive). The weight ratio of the larger to smaller nanoparticles can be in the range of 2:98 to 98:2, in the range of 5:95 to 95:5, in the range of 10:90 to 90:10, or in the range of 20:80 to 80:20. For instance, in certain embodiments the first distribution of the first silica nanoparticles comprises average particle size diameters of 100 nm to 250 nm, inclusive, and the second distribution of the first silica nanoparticles comprises average particle size diameters of 1 nm to 90 nm, inclusive. In at least certain embodiments according to the present disclosure, use of different sizes of silica nanoparticles can result in achieving a smaller pore size through the networks.

Coating dispersions (e.g., aqueous coating formulations) having a bimodal distribution of silica nanoparticles (e.g., the first silica nanoparticles and/or the second silica nanoparticles) can include 0.1 to 50 weight percent silica nanoparticles having an average particle size of 90 nanometers or less and 0 to 50 weight percent silica nanoparticles having an average particle size of 100 nanometers or greater. The amount is based on a total weight of the aqueous coating formulation to be applied to a microporous substrate. The silica nanoparticle sizes may be selected to provide a controlled pore size of the silica network.

In certain embodiments, the first silica nanoparticles and the second silica nanoparticles comprise the same average particle size diameters, whereas in other embodiments the first silica nanoparticles and the second silica nanoparticles comprise at least some average particle size diameters that are different from each other.

Generally, the total weight of silica nanoparticles (regardless of size) in a silica coating dispersion (e.g., aqueous coating formulation) is at least 0.1 weight percent based on the total weight of the coating dispersion. For example, a silica coating dispersion can include at least 1 weight percent, at least 2 weight percent, or at least 5 weight percent silica nanoparticles. A silica coating dispersion often contains up to 100 weight percent, up to 80 weight percent, up to 60 weight percent, up to 40 weight percent, up to 30 weight percent up to 20 weight percent, or up to 10 weight percent silica nanoparticles. The amount of silica nanoparticles in the silica coating dispersion can be, for example, in the range of 0.1 to 100 weight percent, in the range of 1 to 80 weight percent, in the range of 1 to 50 weight percent, in the range of 1 to 30 weight percent, in the range of 5 to 20 weight percent, in the range of 1 to 10 weight percent, in the range of 5 to 10 weight percent, or in the range of 1 to 7 weight percent.

The silica nanoparticles are typically commercially available in the form of a silica sol, and the silica nanoparticles may be pyrogenic silica or amorphous silica. Some example spherical silica nanoparticles are available in the form of aqueous-based silica sols such as those commercially available under the trade designation LUDOX (e.g., LUDOX SM) from E.I. DuPont de Nemours and Co., Inc. (Wilmington, Del.). Other example aqueous-based silica sols are commercially available under the trade designation NYACOL from Nyacol Co. (Ashland, Mass.). Additional example aqueous-based silica sols are commercially available under the trade designation ECS SI-4530 from Evonik Industries (Parsippany, N.J.). Still other example aqueous-based silica sols are commercially available under the trade designation NALCO (e.g., NALCO 1115, NALCO 2326, NALCO 2327, NALCO 2329, NALCO DVSNZ004, and NALCO 1130) from Ondea Nalco Chemical Co. (Oak Brook, Ill.). Yet other example aqueous-based silica sols are commercially available under the trade designation REMASOL (e.g., REMASOL SP30) from Remet Corporation (Utica, N.Y.) and under the trade designation SILCO (e.g., SILCO LI-518) from Silco International (Portland, Oreg.). Further suitable spherical silica nanoparticles may be obtained in the form of aqueous-based silica sols under the trade designation SNOWTEX from Nissan Chemical Industries (Tokyo, Japan).

Suitable non-spherical (i.e., acicular) silica nanoparticles may be obtained in the form of aqueous-based silica sols under the trade designation SNOWTEX from Nissan Chemical Industries (Tokyo, Japan). For example, SNOWTEX-UP contains silica nanoparticles having a diameter in the range of about 9 to 15 nanometers with lengths in a range of 40 to 300 nanometers. SNOWTEX-PS-S and SNOWTEX-PS-M have a chain of beads morphology. The SNOWTEX-PS-M particles are about 18 to 25 nanometers in diameter and have lengths of 80 to 150 nanometers. The SNOWTEX-PS-S has a particle diameter of 10-15 nm and a length of 80-120 nanometers.

Suitable pyrogenic (i.e., fumed) amorphous silica nanoparticles may be obtained in the form of aqueous-based dispersions under the trade designation CAB-O-SPERSE (e.g, CAB-O-SPERSE 2012A, CAB-O-SPERSE 2017A, CAB-O-SPERSE 2020K, and CAB-O-SPERSE 4012K), from Cabot Corporation (Tuscola, Ill.).

Either water or a water-miscible organic solvent can be used to dilute commercially available aqueous-based silica sols.

The silica coating dispersion (e.g., aqueous coating formulation) contains an acid having a pKa ($H_2O$) that is less than or equal to 3.5. The use of weaker acids such as those having a pKa greater than 4 (e.g., acetic acid) typically does not result a uniform coating (i.e., layer) having desirable transmissivity and/or durability. In particular, coating dispersions with weaker acids such as acetic acid typically bead up on the surface of a substrate. The pKa of the acid added to the coating dispersion is often less than 3, less than 2.5, less than 2, less than 1.5, or less than 1. Useful acids that can be used to adjust the pH of the silica coating dispersion include both organic and inorganic acids. Example acids include, but are not limited to, oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. In many embodiments, the acid is HCl, $HNO_3$, $H_2SO_4$, or $H_3PO_4$. Without wishing to be bound by theory, it is believed that some of the silica in contact with acid undergoes a condensation reaction in which silicon dioxide is reacted with acid to form a silicic acid. The silicic acid is capable of forming a continuous three-dimensional porous network of interconnected acid-sintered silica nanoparticles upon drying of the acidified silica coating dispersion. In some embodiments, it is desirable to provide a mixture of an organic and inorganic acid. If commercially available acidic silica sols are used, the addition of one of the acids listed above typically result in silica networks having the desired uniformity.

The silica coating dispersion (e.g., aqueous coating formulation) generally contains sufficient acid to provide a pH no greater than 5. The pH is often no greater than 4.5, no greater than 4, no greater than 3.5, or no greater than 3. For example, the pH is often in the range of 2 to 5. In some embodiments, the silica coating dispersion can be adjusted to a pH in the range of 5 to 6 after first reducing the pH to less than 5. This pH adjustment can allow the coating of pH sensitive substrates. The acid-sintered silica nanoparticles appear to be stable when the pH is in the range 2 to 4. Light-scattering measurements have demonstrated that the acidified silica nanoparticles at pH in the range of 2 to 3 and at a concentration of 10 weight percent silica nanoparticles can retain the same size for more than a week or even more than a month. Such acidified silica coating dispersions are expected to remain stable even longer if the concentration of silica nanoparticles is lower than 10 weight percent.

Silica coating dispersions (e.g., aqueous coating formulations) typically further include water or a mixture of water plus a water-miscible organic solvent. Suitable water-miscible organic solvents include, but are not limited to, various alcohols (e.g., ethanol or isopropanol) and glycols (e.g., propylene glycol), ethers (e.g., propylene glycol methyl ether), ketones (e.g., acetone), and esters (e.g., propylene glycol monomethyl ether acetate). The silica nanoparticles included in the silica coating dispersions typically are not surface modified.

As applied to a substrate surface or another silica coating layer, a silica coating dispersion (e.g., aqueous coating formulation) is a sol. After the silica coating dispersion is applied to the substrate or other layer, a gelled material forms as the sol dries and the silica nanoparticles sinter to form the continuous network.

The typical average dry coating thickness of the first layer and the second layer in combination (e.g., the thickness of the first layer plus the thickness of the second layer) is in the range of 0.1 micrometers (µm) to 10.0 µm, 0.5 µm to 10.0 µm, or 0.5 µm to 5.0 µm, or 1.0 µm to 4.0 µm, inclusive. Each silica layer typically contains at least 50 weight percent, at least 60 weight percent, at least 70 weight percent, at least 80 weight percent, at least 85 weight percent silica nanoparticles, based on a total weight of the dried silica network. Each (dried) silica network can independently contain up to 90 weight percent, up to 95 weight percent, or up to 99 percent or higher silica nanoparticles based on the total weight of the dried silica network. For example, each dried silica network can independently contain 50 to greater than 99 weight percent, 50 to 95 weight percent, 50 to 90 weight percent, 50 to 99 weight percent, 75 to 99 percent, 75 to 95 weight percent, 80 to 99 weight percent, or 85 to 95 weight percent silica nanoparticles, inclusive. Likewise, each dried silica network can independently contain 1 to 50 weight percent, 1 to 40 weight percent, 5 to 50 weight percent, 10 to 50 weight percent, or 10 to 30 weight percent polymer binder, inclusive.

The first layer includes a polymeric binder, and in certain embodiments the second layer also includes a polymeric binder. A polymeric binder assists in providing elasticity to the continuous three-dimensional porous network of acid-sintered interconnected silica nanoparticles of a layer, which results in greater resistance to damage (e.g., cracking) to the network during preparation, handling, and use of the article. Moreover, the polymeric binder typically adds viscosity to the dispersion (e.g., aqueous coating formulation) to assist in coating the dispersion on the microfiltration membrane. A weight ratio of the silica nanoparticles to the polymer binder in each of the first layer and the second layer is often in a range from 90:10 to 70:30, inclusive. Suitable polymeric binders include at least one hydroxyl group or hydrolyzable group that can react with the acid-sintered silica nanoparticles. When a polymeric binder is included in each of the first layer and the second layer, the first polymeric binder and the second polymeric binder can be either the same or different, such as independently selected from poly(vinyl alcohol) (PVA), a polysaccharide, a urethane resin, and an acrylate resin. Likewise, when a polymeric binder is included in a third layer, the polymeric binder may be selected from PVA, a polysaccharide, a urethane resin, and an acrylate resin.

In certain embodiments, the polymeric binder comprises poly(vinyl alcohol) (PVA). PVA is a polymer that is known and available commercially. Typically, PVA is prepared by hydrolyzing acetate groups to hydroxyl groups. PVA, silane-modified PVA, and combinations thereof, are employed in certain embodiments of multilayer coatings of the present invention. Silane-modified PVA is believed to provide improved strength to the PVA and/or to enhance adhesion of the PVA to the silica nanoparticles. Suitable silane-modified polyvinyl alcohols include those known in the art, such as silane-modified PVA produced via treating vinyl alcohol polymers with one or more ethylenically unsaturated, silane-containing monomers at elevated temperature. See, for example, U.S. Pat. No. 7,723,424 (Hashemzadeh et al.). Alternatively, U.S. Pat. No. 4,567,221 (Maruyama et al.) discloses synthesizing a silylated PVA by copolymerizing vinyl acetate and vinyl alkoxy silanes, subsequently followed by hydrolyzing the acetate groups. Any suitable PVA may be employed, for example KURARAY R-2105, which is a trade designation for a silane modified polyvinyl alcohol polymer commercially available from Kuraray Co. LTD, Japan. Another suitable PVA is KURARAY PVA 235, which is a trade designation for a polyvinyl alcohol polymer that is also commercially available from Kuraray Co. LTD, Japan. In some embodiments the PVA is partially hydrolyzed, whereas in other embodiments the PVA is fully hydrolyzed.

Generally, the total weight of PVA in the silica coating dispersion (e.g., aqueous coating formulation) is at least 0.1 weight percent based on the total weight of the coating dispersion. A silica coating dispersion often contains up to 50 weight percent, up to 30 weight percent, up to 20 weight percent or up to 10 weight percent PVA. For example, a silica coating dispersion can include at least 1 weight percent, at least 2 weight percent, or at least 5 weight percent PVA. Similarly, the total weight of PVA in the second layer coating dispersion (e.g., aqueous coating formulation) is generally at least 0.1 weight percent based on the total weight of the coating dispersion. A second layer coating dispersion often contains up to 50 weight percent, up to 30 weight percent, up to 20 weight percent, up to 10 weight percent, or up to 5 weight percent PVA. For example, a second layer coating dispersion can include at least 0.1 weight percent, at least 0.25 weight percent, at least 0.5 weight percent, at least 1 weight percent, at least 2 weight percent, or at least 5 weight percent PVA.

In certain embodiments, the polymeric binder comprises a polysaccharide (e.g., a carbohydrate containing more than three monosaccharide units per molecule). Some suitable polysaccharides include for example dextran, cellulose, chitin, and chitosan. Dextran, for instance, is a polymer that is known and available commercially. More particularly, dextran is a water-soluble polysaccharide of glucose produced by the fermentation of Leuconostoc mesenteroides on sucrose. It is preferred that the molecular weight of the dextran be greater than about 5,000 grams per mole and more preferred that the molecular weight is greater than about 40,000 grams per mole, such as 100,000 grams per mole or 249,000 grams per mole.

Cellulose derivatives are also suitable polysaccharides, containing repeated glucose units bonded together by beta-linkages. Suitable cellulose derivatives include for instance and without limitation cellulose ether, hydroxyethyl cellulose, hydroxypropyl cellulose, hydroxypropyl methylcellulose, copolymers of hydroxyethyl cellulose and diallyldimethyl ammonium chloride, and derivatives and combinations thereof.

Chitin is another suitable polysaccharide, containing N-acetylglucosamine units, which form covalent beta-1,4 linkages. Chitin is commercially available and produced by fungi, arthropods and nematodes. Chitosan, a derivative of chitin, is yet another suitable polysaccharide. Chitosan contains randomly distributed beta-(1-4)-linked D-glucosamine and N-acetyl-D-glucosamine.

Generally, the total weight of a polysaccharide (e.g., dextran, cellulose derivative, chitin, chitosan, etc.) in a silica coating dispersion (e.g., aqueous coating formulation) is at least 0.1 weight percent based on the total weight of the coating dispersion. A silica coating dispersion often contains up to 50 weight percent, up to 30 weight percent, up to 20 weight percent or up to 10 weight percent polysaccharide. For example, a silica coating dispersion can include at least 1 weight percent, at least 2 weight percent, or at least 5 weight percent polysaccharide. Similarly, the total weight of polysaccharide in the second layer coating dispersion (e.g., aqueous coating formulation) is generally at least 0.1 weight percent based on the total weight of the coating dispersion. A second layer coating dispersion often contains up to 50 weight percent, up to 30 weight percent, up to 20 weight percent, up to 10 weight percent, or up to 5 weight percent polysaccharide. For example, a second layer coating dispersion can include at least 0.1 weight percent, at least 0.25 weight percent, at least 0.5 weight percent, at least 1 weight percent, at least 2 weight percent, or at least 5 weight percent polysaccharide.

In certain embodiments, the polymeric binder comprises a urethane resin. Suitable urethane resins include polymers made from the reaction product of a compound containing at least two isocyanate groups (—N═C═O), referred to herein as "isocyanates", and a compound containing at least two active-hydrogen containing groups. Examples of active-hydrogen containing groups include primary alcohols, secondary alcohols, phenols and water. Other active-hydrogen containing groups include primary and secondary amines which react with the isocyanate to form a urea linkage, thereby making a polyurea. A wide variety of isocyanate-terminated materials and appropriate co-reactants are well known, and many are commercially available (see, for example, Gunter Oertel, "Polyurethane Handbook", Hanser Publishers, Munich (1985)).

Generally, the total weight of urethane in a silica coating dispersion (e.g., aqueous coating formulation) is at least 0.1 weight percent based on the total weight of the coating dispersion. A silica coating dispersion often contains up to 50 weight percent, up to 30 weight percent, up to 20 weight percent or up to 10 weight percent urethane. For example, a silica coating dispersion can include at least 1 weight percent, at least 2 weight percent, or at least 5 weight percent urethane. Similarly, the total weight of urethane in the second layer coating dispersion (e.g., aqueous coating formulation) is generally at least 0.1 weight percent based on the total weight of the coating dispersion. A second layer coating dispersion often contains up to 50 weight percent, up to 30 weight percent, up to 20 weight percent, up to 10 weight percent, or up to 5 weight percent urethane. For example, a second layer coating dispersion can include at least 0.1 weight percent, at least 0.25 weight percent, at least 0.5 weight percent, at least 1 weight percent, at least 2 weight percent, or at least 5 weight percent urethane.

In certain embodiments, the polymeric binder comprises an acrylate resin. Suitable acrylate resins include, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones. Suitable acrylates include methyl methacrylate, methacrylic acid, tetrahydrofurfuryl methacrylate, isobornyl acrylate, and isobornyl methacrylate. Multifunctional (meth)acrylic acid esters can optionally be included as crosslinking agents. These multifunctional (meth)acrylates can include, but are not limited to, ethylene glycol dimethacrylate, 1,6-hexanediol dimethacrylate, 1,6-hexanediol diacrylate, trimethylolpropane triacrylate, pentaerythritol tetraacrylate, 1,2-ethylene glycol diacrylate, the dimethacrylate of ethylene oxide modified bisphenol A and the diacrylate of ethylene oxide modified bisphenol A.

Generally, the total weight of acrylate in a silica coating dispersion (e.g., aqueous coating formulation) is at least 0.1 weight percent based on the total weight of the coating dispersion. A silica coating dispersion often contains up to 50 weight percent, up to 30 weight percent, up to 20 weight percent or up to 10 weight percent acrylate. For example, a silica coating dispersion can include at least 1 weight percent, at least 2 weight percent, or at least 5 weight percent acrylate. Similarly, the total weight of acrylate in the second layer coating dispersion (e.g., aqueous coating formulation) is generally at least 0.1 weight percent based on the total weight of the coating dispersion. A second layer coating dispersion often contains up to 50 weight percent, up to 30 weight percent, up to 20 weight percent, up to 10 weight percent, or up to 5 weight percent acrylate. For example, a second layer coating dispersion can include at least 0.1 weight percent, at least 0.25 weight percent, at least 0.5 weight percent, at least 1 weight percent, at least 2 weight percent, or at least 5 weight percent acrylate.

In certain embodiments, a surfactant is employed to facilitate contact between the microporous material and a continuous three-dimensional porous network of acid-sintered interconnected silica nanoparticles. Surfactants are molecules having both hydrophilic (polar) and hydrophobic (non-polar) regions and that are capable of reducing the surface tension of a coating dispersion (e.g., aqueous coating formulation). Useful surfactants may include those disclosed, for example, in U.S. Pat. No. 6,040,053 (Scholz et al.). If added, the surfactant is typically present in an amount up to 5 weight percent based on a total weight of a total silica coating dispersion. For example, the amount can be up to 4 weight percent, up to 2 weight percent, or up to 1 weight percent. The surfactant is typically present in an amount equal to at least 0.001 weight percent, at least 0.005 weight percent, at least 0.01 weight percent, at least 0.05 weight percent, at least 0.1 weight percent or at least 0.5 weight percent of a total silica coating dispersion. Similarly, a surfactant may be included in a second layer to facilitate contact between the metal nanoparticles, metal nanowires, and/or silica nanoparticles with the first layer. If added, the surfactant is typically present in an amount up to 5 weight percent based on a total weight of a total second layer coating dispersion. For example, the amount can be up to 4 weight percent, up to 2 weight percent, or up to 1 weight percent. The surfactant is typically present in an amount equal to at least 0.001 weight percent, at least 0.005 weight percent, at least 0.01 weight percent, at least 0.05 weight percent, at least 0.1 weight percent or at least 0.5 weight percent of a total second layer coating dispersion.

Some suitable surfactants are anionic surfactants. Useful anionic surfactants often have a molecular structure with (1) at least one hydrophobic group such as a $C_6$-$C_{20}$ alkyl, alkylaryl, and/or alkenyl groups, (2) at least one anionic group such as sulfate, sulfonate, phosphate, polyoxyethylene sulfate, polyoxyethylene sulfonate, polyoxyethylene phosphate, and the like, and/or the salts of such anionic groups. Suitable salts include alkali metal salts, ammonium salts, tertiary amino salts, and the like. Representative commercial examples of useful anionic surfactants include, but are not limited to, sodium lauryl sulfate (available, for example, under the trade designation TEXAPON L-100 from Henkel Inc. (Wilmington, Del.) and under the trade designation POLYSTEP B-3 from Stepan Chemical Co. (Northfield, Ill.)); sodium lauryl ether sulfate (available, for example, under the trade designation POLYSTEP B-12 from Stepan Chemical Co. (Northfield, Ill.)); ammonium lauryl sulfate (available, for example, under the trade designation STANDAPOL A from Henkel Inc. (Wilmington, Del.)); and sodium dodecyl benzene sulfonate (available, for example, under the trade designation SIPONATE DS-10 from Rhone-Poulenc, Inc. (Cranberry, N.J.)).

Other useful surfactants are non-ionic surfactants. Suitable non-ionic surfactants include, but are not limited to, polyethoxylated alkyl alcohols (available, for example, under the trade designations BRIJ 30 and BRIJ 35 from ICI Americas, Inc. (Wilmington, Del.) and under the trade designation TERGITOL TMN-6 from Dow Chemical (Midland, Mich.)); polyethoxylated alkyl phenols (available, for example, under the trade designations TRITON X-100 from Roche (Mannheim, Germany) and ICONOL NP-70 from BASF Corp. (Florham Park, N.J.)); and polyethylene glycol/polypropylene glycol block copolymers (available, for example, under the trade designations TETRONIC 1502, TETRONIC 908, and PLURONIC F38 from BASF Corp. (Florham Park, N.J.)).

In certain embodiments, the microfiltration membranes for use in aspects of the present disclosure include Thermally Induced Phase Separation (TIPS) membranes. The pore size of TIPS membranes can be generally controlled due to the ability to select the extent of stretching of the membrane material. TIPS membranes are relatively inexpensive to make, and methods for making them are known to the skilled practitioner. For example, various membranes and methods are described in detail in U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.). Microfiltration membranes for use in aspects of the present disclosure also include Solvent Induced Phase Separated (SIPS) membranes and other microporous membranes made by extrusion, extrusion/stretching and extrusion/stretching/extraction processes, and track etching processes. Suitable microfiltration membranes that may be formed by SIPS include for example and without limitation polyvinylidene fluoride (PVDF), poly (ether sulfone) (PES), polysulfone (PS), polyacrylonitrile (PAN), nylon (i.e., polyamide), cellulose acetate, cellulose nitrate, regenerated cellulose, and polyimide.

In certain embodiments, the microfiltration membrane substrate comprises a thermoplastic polymer, for instance poly(ethersulfone), polyacrylonitrile, polyamide, cellulose acetate, cellulose nitrate, regenerated cellulose, or combinations thereof.

In certain embodiments, the first major surface of the microfiltration membrane substrate comprises an average pore size of at least 50 nanometers (nm), at least 100 nm, at least 250 nm, at least 500 nm, or even at least 750 nm, and up to 2 micrometers (µm), up to 1.5 µm, or even up to 1 µm. Stated another way, in certain embodiments the first major surface of the microfiltration membrane has an average pore size of 50 nm to 2 micrometers, inclusive; 50 nm to 1 µm, inclusive; 100 nm to 1.5 µm, inclusive; or 250 nm to 2 µm, inclusive.

Advantageously, the multilayer article of at least some embodiments of the present disclosure may be used to remove microorganisms from a fluid sample, such as bacteriophages, bacteria, viruses, or a combination thereof. For instance, the multilayer article typically provides a log reduction value of at least 1.0, at least 1.5, at least 2.0, at least 2.5, at least 3.0, at least 3.5, at least 4.0, at least 4.5, at least 5.0, at least 5.5, or even at least 6.0 for a fluid containing a bacteriophage that is passed through the multilayer article under a constant flow rate of 1.0 mL/minute at 20-25 degrees Celsius in a sample cell. Such conditions are described in detail in the Examples below.

Multilayer articles may be prepared using a method including (a) saturating a microfiltration membrane substrate with a liquid, the microfiltration membrane substrate having a first major surface; (b) applying a first aqueous coating formulation to at least a portion of the first major surface of the microfiltration membrane substrate to form a coated substrate, the first aqueous coating formulation comprising water, a first polymeric binder, a first acid, and a plurality of first silica nanoparticles; (c) sintering the coated substrate, thereby forming a first layer directly attached to the first major surface of the microfiltration membrane substrate, the first layer having a first major surface.

Multilayer articles according to the first aspect further include either (d) applying a second aqueous coating formulation to the first major surface of the first layer to form a twice-coated substrate, the second aqueous coating formulation comprising water, a second acid, a second polymeric binder, and at least one of metal nanoparticles or metal nanowires; and (e) sintering the twice-coated substrate, thereby forming the multilayer article, the multilayer article comprising a second layer directly attached to the first major surface of the first layer; or include (f) applying a metal coating to the first major surface of the first layer to form a twice-coated substrate. Similarly, multilayer articles according to the second aspect further include (d) applying a second aqueous coating formulation to the first major surface of the first layer to form a twice-coated substrate, the second aqueous coating formulation comprising water, a second acid, a second polymeric binder, a plurality of metal nanoparticles or metal nanowires, and a plurality of second silica nanoparticles; and (e) sintering the twice-coated substrate, thereby forming the multilayer article, the multilayer article comprising a second layer directly attached to the first major surface of the first layer.

In many embodiments, the method further comprises removing excess liquid from the first major surface of the microfiltration membrane substrate prior to applying the first aqueous coating formulation. Removing such excess liquid can minimize dilution of the coating formulation upon application to the microfiltration membrane substrate. Often, the liquid is hydrophilic (e.g., containing glycerol, ethylene glycol, and/or water) in order to readily saturate the microfiltration membrane substrate and assist in localizing the aqueous coating formulation at the major surface of the substrate (rather than soaking substantially down into the substrate). In select embodiments, the liquid comprises water or consists essentially of water.

In certain embodiments, the first aqueous coating formulation, the second aqueous coating formulation, or both, comprises at least one alcohol as a co-solvent to assist in stabilizing the silica sol. Suitable alcohols include for instance and without limitation, isopropyl alcohol, ethanol, butanol, ethylene glycol, and glycerol.

Advantageously, it is not necessary to employ high temperatures to dry (e.g., sinter) each aqueous coating formulation on the microfiltration membrane substrate. For instance, the sintering of each of the coated substrate and the twice-coated substrate often occurs at a temperature of no greater than 200 degrees Celsius, no greater than 175 degrees Celsius, no greater than 150 degrees Celsius, no greater than 125 degrees Celsius, or no greater than 100 degrees Celsius.

Typically, the first layer comprises a plurality of acid-sintered interconnected first silica nanoparticles arranged to form a continuous three-dimensional porous network. When forming such a network, the first aqueous coating formulation comprises a pH of less than 5, as discussed in detail above. The second aqueous coating formulation may also comprise a pH of less than 5. For instance, the first acid and the second acid can be independently selected from nitric acid, phosphoric acid, sulfuric acid, and hydrochloric acid.

EMBODIMENTS

Embodiment 1 is a multilayer article. The multilayer article comprises a) a microfiltration membrane substrate, the microfiltration membrane substrate having a first major surface; and b) a first layer having a first major surface and a second major surface disposed opposite the first major surface. The first major surface of the first layer is directly attached to the first major surface of the microfiltration membrane substrate. The first layer includes a first polymeric binder and a plurality of acid-sintered interconnected first silica nanoparticles arranged to form a continuous three-dimensional porous network. The multilayer article further includes c) a second layer attached to the second major surface of the first layer. The second layer includes i) a metal coating or ii) a composite coating comprising a second polymeric binder and at least one of metal nanoparticles or metal nanowires.

Embodiment 2 is the multilayer article of embodiment 1, wherein the metal coating includes a layer of at least one of copper, silver, gold, titanium, cobalt, nickel, zinc, zirconium, platinum, or alloys thereof.

Embodiment 3 is the multilayer article of embodiment 1 or embodiment 2, wherein the metal coating includes a layer of copper.

Embodiment 4 is the multilayer article of any of embodiments 1 to 3, wherein the composite coating includes metal nanoparticles.

Embodiment 5 is the multilayer article of any of embodiments 1 to 4, wherein the composite coating includes metal nanowires.

Embodiment 6 is the multilayer article of any of embodiments 1 to 5, wherein the metal nanoparticles include at least one of copper, silver, gold, titanium, cobalt, nickel, zinc, zirconium, platinum, or alloys thereof.

Embodiment 7 is the multilayer article of any of embodiments 1 to 6, wherein the metal nanowires include at least one of copper, silver, gold, titanium, cobalt, nickel, zinc, zirconium, platinum, or alloys thereof.

Embodiment 8 is the multilayer article of any of embodiments 1 to 7, wherein the metal nanoparticles have an average particle diameter of between 10 nanometers and 999 nanometers, inclusive.

Embodiment 9 is the multilayer article of any of embodiments 1 to 8, wherein the metal nanoparticles have an average particle diameter of between 10 nanometers and 50 nanometers.

Embodiment 10 is the multilayer article of any of embodiments 1 to 9, wherein the metal coating has an average thickness of 5 nanometers to 20 nanometers, inclusive.

Embodiment 11 is the multilayer article of any of embodiments 1 to 10, wherein the first polymeric binder and the second polymeric binder are the same.

Embodiment 12 is the multilayer article of any of embodiments 1 to 11, wherein the first polymeric binder and the second polymeric binder are independently selected from poly(vinyl alcohol) (PVA), a polysaccharide, a urethane resin, and an acrylate resin.

Embodiment 13 is the multilayer article of any of embodiments 1 to 12, wherein the second layer is directly attached to the second major surface of the first layer.

Embodiment 14 is the multilayer article of any of embodiments 1 to 12, further including d) a third layer disposed between the first layer and the second layer, the third layer including a plurality of acid-sintered interconnected second silica nanoparticles arranged to form a continuous three-dimensional porous network.

Embodiment 15 is the multilayer article of embodiment 14, wherein the first silica nanoparticles and the second silica nanoparticles include at least some average particle size diameters that are different from each other.

Embodiment 16 is the multilayer article of any of embodiments 1 to 15, wherein the first silica nanoparticles include average particle size diameters less than or equal to 250 nanometers (nm).

Embodiment 17 is the multilayer article of any of embodiments 1 to 16, wherein the first silica nanoparticles have an average particle size diameter of up to 100 nm.

Embodiment 18 is the multilayer article of any of embodiments 1 to 16, wherein the first silica nanoparticles have an average particle size diameter of 110 nm to 250 nm, inclusive.

Embodiment 19 is the multilayer article of any of embodiments 1 to 18, wherein the first silica nanoparticles have a multimodal size distribution.

Embodiment 20 is the multilayer article embodiment 14 or embodiment 15, wherein the second silica nanoparticles have a multimodal size distribution.

Embodiment 21 is the multilayer article of any of embodiments 1 to 20, wherein the first silica nanoparticles have a bimodal size distribution.

Embodiment 22 is the multilayer article of embodiment 19 or embodiment 20, wherein a weight ratio of a first distribution of silica nanoparticles to a second distribution of the first silica nanoparticles in the multimodal size distribution is in a range from 20:80 to 80:20.

Embodiment 23 is the multilayer article of embodiment 22, wherein the first distribution of the first silica nanoparticles comprises average particle size diameters of 100 nm to 250 nm and the second distribution of the first silica nanoparticles includes average particle size diameters of 1 nm to 90 nm.

Embodiment 24 is the multilayer article of any of embodiments 1 through 23, wherein the first silica nanoparticles include fumed silica.

Embodiment 25 is the multilayer article of any of embodiments 1 through 24, wherein the first silica nanoparticles include amorphous silica.

Embodiment 26 is the multilayer article of any of embodiments 1 through 25, wherein a weight ratio of the silica nanoparticles to the polymer binder in the first layer and the second layer is in a range from 90:10 to 70:30.

Embodiment 27 is the multilayer article of any of embodiments 1 through 26, wherein the microfiltration membrane substrate includes a Thermally Induced Phase Separation (TIPS) membrane or a Solvent Induced Phase Separation (SIPS) membrane.

Embodiment 28 is the multilayer article of any of embodiments 1 through 27, wherein the microfiltration membrane substrate includes poly(ether sulfone), polyamide, polyacrylonitrile, cellulose acetate, cellulose nitrate, regenerated cellulose, or combinations thereof.

Embodiment 29 is the multilayer article of any of embodiments 1 through 28, wherein the first major surface of the microfiltration membrane substrate includes an average pore size of 50 nm to 2 micrometers (μm), inclusive.

Embodiment 30 is the multilayer article of any of embodiments 1 through 29, wherein an average thickness of the first layer and the second layer in combination ranges from 0.5 μm to 10 μm, inclusive.

Embodiment 31 is the multilayer article of any of embodiments 1 through 30, wherein an average thickness of the first layer and the second layer in combination ranges from 0.5 μm to 5 μm, inclusive.

Embodiment 32 is the multilayer article of any of embodiments 1 through 31, wherein an average thickness of the first layer and the second layer in combination ranges from 1.0 μm to 4 μm, inclusive.

Embodiment 33 is the multilayer article of any of embodiments 1 through 32, wherein the multilayer article provides a log reduction value of at least 2.0 for a fluid containing a bacteriophage that is passed through the multilayer article under a constant flow rate of 1.0 mL/minute at 20-25 degrees Celsius in a sample cell.

Embodiment 34 is the multilayer article of any of embodiments 1 through 33, wherein the multilayer article provides a log reduction value of at least 4.0 for a fluid containing a bacteriophage that is passed through the multilayer article under a constant flow rate of 1.0 mL/minute at 20-25 degrees Celsius in a sample cell.

Embodiment 35 is the multilayer article of any of embodiments 1 through 34, wherein the multilayer article provides a log reduction value of at least 6.0 for a fluid containing a bacteriophage that is passed through the multilayer article under a constant flow rate of 1.0 mL/minute at 20-25 degrees Celsius in a sample cell.

Embodiment 36 is a multilayer article. The multilayer article comprises a) a microfiltration membrane substrate, the microfiltration membrane substrate having a first major surface; and b) a first layer having a first major surface and a second major surface disposed opposite the first major surface. The first major surface of the first layer is directly attached to the first major surface of the microfiltration membrane substrate. The first layer comprises a first polymeric binder and a plurality of acid-sintered interconnected first silica nanoparticles arranged to form a continuous three-dimensional porous network. The multilayer article further includes c) a second layer attached to the second major surface of the first layer. The second layer includes a second polymeric binder, a plurality of metal nanoparticles or metal nanowires, and a plurality of second silica nanoparticles arranged to form a continuous three-dimensional porous network.

Embodiment 37 is the multilayer article of embodiment 36, wherein the first polymeric binder and the second polymeric binder are the same.

Embodiment 38 is the multilayer article of embodiment 36 or embodiment 37, wherein the first polymeric binder and the second polymeric binder are independently selected from poly(vinyl alcohol) (PVA), a polysaccharide, a urethane resin, and an acrylate resin.

Embodiment 39 is the multilayer article of any of embodiments 36 to 38, wherein the first silica nanoparticles and the second silica nanoparticles include the same average particle size diameters.

Embodiment 40 is the multilayer article of any of embodiments 36 to 38, wherein the first silica nanoparticles and the second silica nanoparticles include at least some average particle size diameters that are different from each other.

Embodiment 41 is the multilayer article of any of embodiments 36 to 40, wherein the first silica nanoparticles include average particle size diameters less than or equal to 250 nanometers (nm).

Embodiment 42 is the multilayer article of any of embodiments 36 to 41, wherein the first silica nanoparticles and the second silica nanoparticles each include average particle size diameters of up to 100 nm, inclusive.

Embodiment 43 is the multilayer article of any of embodiments 36 to 41, wherein the first silica nanoparticles and the second silica nanoparticles each include average particle size diameters of 110 nm to 250 nm, inclusive.

Embodiment 44 is the multilayer article of any of embodiments 36 to 43, wherein the first silica nanoparticles have a multimodal size distribution.

Embodiment 45 is the multilayer article of any of embodiments 36 to 44, wherein the second silica nanoparticles have a multimodal size distribution.

Embodiment 46 is the multilayer article of any of embodiments 36 to 45, wherein the first silica nanoparticles and the second silica nanoparticles each have a bimodal size distribution.

Embodiment 47 is the multilayer article of any of embodiments 44 to 46, wherein a weight ratio of a first distribution of silica nanoparticles to a second distribution of the first silica nanoparticles in the multimodal size distribution is in a range from 20:80 to 80:20.

Embodiment 48 is the multilayer article of embodiment 47, wherein the first distribution of the first silica nanoparticles includes average particle size diameters of 100 nm to 250 nm and the second distribution of the first silica nanoparticles includes average particle size diameters of 1 nm to 90 nm.

Embodiment 49 is the multilayer article of any of embodiments 36 to 48, wherein the first silica nanoparticles, the second silica nanoparticles, or both, include fumed silica.

Embodiment 50 is the multilayer article of any of embodiments 36 to 49, wherein the first silica nanoparticles, the second silica nanoparticles, or both, include amorphous silica.

Embodiment 51 is the multilayer article of any of embodiments 36 to 50, wherein a weight ratio of the silica nanoparticles to the polymer binder in the first layer is in a range from 90:10 to 70:30.

Embodiment 52 is the multilayer article of any of embodiments 36 to 51, wherein the second layer includes metal nanoparticles.

Embodiment 53 is the multilayer article of any of embodiments 36 to 52, wherein the second layer includes metal nanowires.

Embodiment 54 is the multilayer article of any of embodiments 36 to 53, wherein the metal nanoparticles include at least one of copper, silver, gold, titanium, cobalt, nickel, zinc, zirconium, platinum, or alloys thereof.

Embodiment 55 is the multilayer article of any of embodiments 36 to 54, wherein the metal nanowires include at least one of copper, silver, gold, titanium, cobalt, nickel, zinc, zirconium, platinum, or alloys thereof.

Embodiment 56 is the multilayer article of any of embodiments 36 to 55, wherein the metal nanoparticles have an average particle diameter of between 10 nanometers and 999 nanometers, inclusive.

Embodiment 57 is the multilayer article of any of embodiments 36 to 56, wherein the metal nanoparticles have an average particle diameter of between 10 nanometers and 50 nanometers.

Embodiment 58 is the multilayer article of any of embodiments 36 to 57, wherein the second layer is directly attached to the second major surface of the first layer.

Embodiment 59 is the multilayer article of any of embodiments 36 to 57, further including d) a third layer disposed between the first layer and the second layer, the third layer including a plurality of acid-sintered interconnected third silica nanoparticles arranged to form a continuous three-dimensional porous network.

Embodiment 60 is the multilayer article of embodiment 59, wherein the first silica nanoparticles and the third silica nanoparticles include at least some average particle size diameters that are different from each other.

Embodiment 61 is the multilayer article of any of embodiments 36 through 60, wherein the microfiltration membrane substrate includes a Thermally Induced Phase Separation (TIPS) membrane or a Solvent Induced Phase Separation (SIPS) membrane.

Embodiment 62 is the multilayer article of any of embodiments 36 through 61, wherein the microfiltration membrane substrate includes poly(ether sulfone), polyamide, polyacrylonitrile, cellulose acetate, cellulose nitrate, regenerated cellulose, or combinations thereof.

Embodiment 63 is the multilayer article of any of embodiments 36 through 62, wherein the first major surface of the microfiltration membrane substrate includes an average pore size of 50 nm to 2 micrometers (μm), inclusive.

Embodiment 64 is the multilayer article of any of embodiments 36 through 63, wherein an average thickness of the first layer and the second layer in combination ranges from 0.5 μm to 10 μm, inclusive.

Embodiment 65 is the multilayer article of any of embodiments 36 through 64, wherein an average thickness of the first layer and the second layer in combination ranges from 0.5 μm to 5 μm, inclusive.

Embodiment 66 is the multilayer article of any of embodiments 36 through 65, wherein an average thickness of the first layer and the second layer in combination ranges from 1.0 μm to 4 μm, inclusive.

Embodiment 67 is the multilayer article of any of embodiments 36 through 66, wherein the multilayer article provides a log reduction value of at least 2.0 for a fluid containing a bacteriophage that is passed through the multilayer article under a constant flow rate of 1.0 mL/minute at 20-25 degrees Celsius in a sample cell.

Embodiment 68 is the multilayer article of any of embodiments 36 through 67, wherein the multilayer article provides a log reduction value of at least 4.0 for a fluid containing a bacteriophage that is passed through the multilayer article under a constant flow rate of 1.0 mL/minute at 20-25 degrees Celsius in a sample cell.

Embodiment 69 is the multilayer article of any of embodiments 36 through 68, wherein the multilayer article provides a log reduction value of at least 6.0 for a fluid containing a bacteriophage that is passed through the multilayer article under a constant flow rate of 1.0 mL/minute at 20-25 degrees Celsius in a sample cell.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, hr=hour, kg=kilograms, min=minutes, mol=mole; cm=centimeter, mm=millimeter, mL=milliliter, L=liter, MPa=megaPascals, and wt=weight.

| Materials | |
|---|---|
| Material | Description |
| NALCO 2327 | Colloidal silica obtained from Nalco Company, Naperville, IL, under trade designation "NALCO 2327" |
| NALCO 2329 | Colloidal silica obtained from Nalco Company, Naperville, IL, under trade designation "NALCO 2329" |
| CABOT 4012K | Fumed silica obtained from Cabot Corp., Boston, MA, under trade designation "CAB-O-SPERSE 4012K" |

Materials

| Material | Description |
| --- | --- |
| Cu nanopowder (40 nm) | Copper (Cu) nanoparticles (Cu, 99.9%, 40 nm, metal basis) obtained from US Research Nanomaterials, Inc., Houston, TX |
| Cu nanopowder (25 nm) | Copper nanoparticles (Cu, Partially Passivated, 99.8%, 25 nm) obtained from US Research Nanomaterials, Inc., Houston, TX |
| Cu nanopowder (580 nm) | Copper (Cu) nanoparticles (Cu, 99.9%, 580 nm, metal basis) obtained from US Research Nanomaterials, Inc., Houston, TX |
| Ag nanopowder (20 nm) | Silver (Ag) nanoparticles (Ag, 99.99%, 20 nm, metal basis) obtained from US Research Nanomaterials, Inc., Houston, TX |
| Ag nanowire ink | Silver Nanowire, Ink-W (G4)-NKA727-00, obtained from Cambrios Advanced Materials, Sunnyvale CA, under trade designation "CLEAROHM SILVER NANOWIRE COATING MATERIAL" |
| PVA | Polyvinyl alcohol, 98-99 mol %, viscosity 58-68 cps was obtained from Marubeni Specialty Chemicals, Inc., White Plains, NY. PVA was first dissolved in deionized (DI) water to prepare 12.5 wt. % aqueous solution before use |
| IPA | Isopropyl alcohol, obtained from VWR International, West Chester, PA |
| Nitric acid | 68-70 wt. %, obtained from VWR International, West Chester, PA |
| Phi X174 bacteriophage | ATCC 13706, obtained from American Type Culture Collection, Manassas, VA |
| Phosphate buffer | Obtained from Sigma Aldrich Chemical Company, St. Louis, MO |
| PES | Microporous poly(ether sulfone) membrane, 111 μm thick, obtained from 3M Purification., Inc., St. Paul, MN, under trade designation "MICRO PES" |
| DI water | Deionized water, obtained from Milli-Q EMD Millipore, Billerica, MA |

Test Methods:

The flux of coated article prepared as described in Examples below were measured inside a stirred cell (obtained from EMD Millipore, Billerica, Mass. under trade designation "AMICON", catalog number: UFSC05001) under constant pressure. The stir bar that came with the stirred cell was not used during flux measurements. The 44.5 mm stirred cell had a maximum working volume of 50 mL and an effective membrane area of 13.4 cm².

The Phi X174 clearance test was performed on disks (diameter, Φ=47 mm) punched from coated article at a constant flow rate of 1.0 mL/min using a peristaltic pump. The concentration of Phi X174 in both influent and effluent samples was determined by a standard plaque count method utilizing the bacteriophage host $E.\ coli$ (ATCC 13706), nutrient broth bottom agar and nutrient broth with 0.5% agar as top agar. The plates were incubated at 37° C. overnight prior to enumeration.

The log reduction values (LRV) were calculated using the following equation:

$$LRV = \log_{10}\left(\frac{A}{B}\right)$$

Where: A=Total number of bacteriophage in the challenge solution (influent)
B=Total number of bacteriophage in the filtrate (effluent)
SEM images were taken using JEOL JSM-6010LA (obtained from JEOL USA, Peabody, Mass.).

Example 1

Double-Layer Silica Nanoparticle Coated PES with Cu Coating

A silica nanoparticle coating formulation containing NALCO 2329 (cation and anion exchanged, 3.0 g), PVA (3.2 g, 12.5 wt. % in DI water), DI water (5.0 g) and IPA (0.5 g), with pH adjusted to 2-3 using nitric acid was prepared. The formulation was hand coated using a Meyer rod (#3) twice on a PES membrane, dried and sintered at 85° C. in an oven for 15 min after each coating step. Before applying the coating formulation, the PES membrane was saturated with DI water and the excess water on the surface was wicked away using a paper towel.

This double-layer silica nanoparticle coated article was used as substrate for depositing Cu layer via a batch sputtering deposition process. The substrate was placed on a substrate holder set up inside a vacuum chamber with a sputtering metal (Cu) target (76.2 mm diameter) located at a height of 228.6 mm above the substrate holder. After the chamber was evacuated to $2 \times 10^{-5}$ torr ($2.67 \times 10^{-3}$ Pa) base pressure, argon was admitted inside the chamber and total pressure of the chamber was adjusted to 1.6 millitorr (0.21 Pa). Sputtering was initiated using a DC power supply at a constant power level of 0.50 kilowatts to form Cu coating of desired thickness: it took 21, 42 and 84 seconds to deposit 5 nm, 10 nm and 20 nm thick Cu coatings, respectively.

The flux and LRV of the Example 1 samples having 0, 5, 10 and 20 nm thick Cu coatings thereon was determined using the test methods described above. The data was summarized in Table 1, below.

TABLE 1

| Thickness of Cu Coating on Example 1 sample (nm) | Flux (LMH/Bar) | LRV |
| --- | --- | --- |
| None | 7.3 ± 0.0 | 1.38 |
| 5 | 5.0 ± 0.1 | 4.69 |
| 10 | 7.0 ± 0.6 | 6.34 |
| 20 | 3.2 ± 0.0 | 6.34 |

Example 2

Single-Layer Silica Nanoparticle Coated PES with 10 nm Thick Cu Coating

Example 2 sample was prepared in essentially the same manner as Example 1 described above except that a Mayer rod (#6) was used to apply a single-layer of silica nanoparticle coating formulation contained CABOT 4012K (cation exchanged, 12.0 g), NALCO 2327 (cation exchanged, 1.0 g), PVA (3.8 g, 12.5 wt. % in DI water), DI water (1.4 g) and IPA (1.0 g), with pH adjusted to 2-3 using nitric acid. This single-layer silica nanoparticle coated article was used as substrate and a 10 nm thick coating of Cu was applied via the sputter deposition process described above in Example 1.

For the 10 nm thick Cu coated Example 2 article, the flux was 142.1±3.4 LMH/Bar and LRV was 6.5. For the silica nanoparticle coated substrate of Example 2 without Cu coating on top, the flux of was 115.2±3.6 and LRV was 1.08.

Example 3

Figure 3:
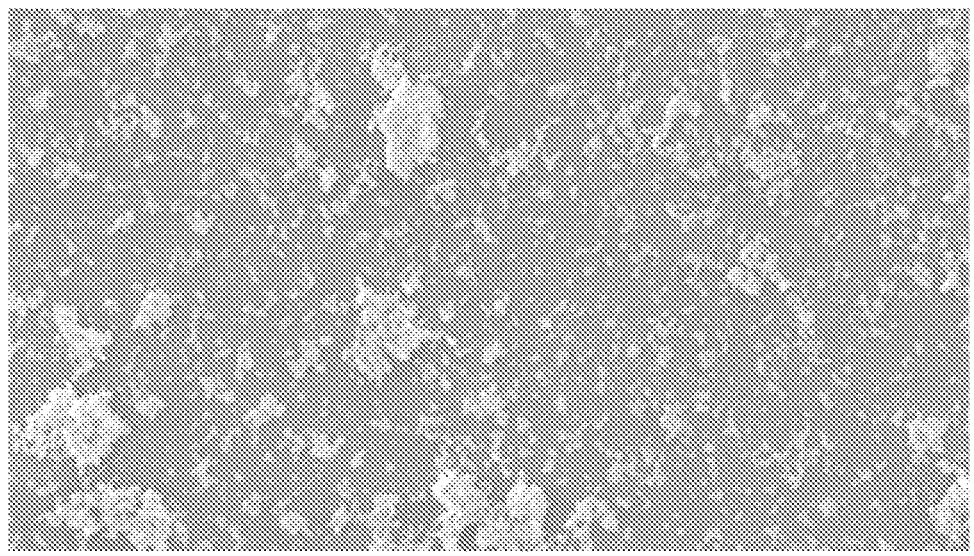
FIG. 3 is a scanning electron micrograph of a top view of the Example 3 multilayer article including copper nanoparticles.

Single-Layer Silica Nanoparticle Coated PES with Cu NPs (40 nm) Layer on Top Surface A silica nanoparticle coating formulation containing CABOT 4012K (cation exchanged, 12.0 g), NALCO 2327 (cation exchanged, 1.0 g), PVA (5.2 g, 12.5 wt. % in DI water) and IPA (1.0 g), with pH adjusted to 2-3 using nitric acid was hand coated on PES membrane using a Meyer rod (#3). Before applying the coating formulation, the PES membrane was saturated with DI water and the excess of water on the surface was wicked away using paper towel. The coated PES membrane was dried and sintered at 85° C. in an oven for 15 min. Then, a second metal nanoparticle coating formulation containing Cu nanopowder (40 nm, 0.40 g), PVA (0.8 g, 12.5 wt. % in DI water), DI water (8.5 g), IPA (0.5 g), with pH adjusted to 2-3 using nitric acid was hand coated using Meyer rod (#3), dried and sintered at 85° C. in an oven for 15 min to prepare the Example 3 sample. FIG. 3 is a scanning electron micrograph of a top view of the Example 3 multilayer article, which shows a plurality of copper nanoparticles in the second layer.

For the Example 3 sample, the flux was 60.8±0.9 LMH/Bar and LRV was 8.0.

To prepare a control sample for Example 3, a silica nanoparticle coating formulation containing CABOT 4012K (cation exchanged, 12.0 g), NALCO 2327 (cation exchanged, 1.0 g), PVA (5.2 g, 12.5 wt. % in DI water) and IPA (1.0 g), with pH adjusted to 2-3 using nitric acid was hand coated on PES membrane using a Meyer rod (#6). Before applying the coating formulation, the PES membrane was saturated with DI water and the excess of water on the surface was wicked away using paper towel. The coated PES membrane was dried and sintered at 85° C. in an oven for 15 min.

For the control sample for Example 3, the flux was 100.1±2.3 LMH/Bar and LRV was 1.21.

Example 4

Cu NPs (25 nm) Coated on Top of Silica Nanoparticle Coating on PES Membrane

Example 4 was prepared in essentially the same manner as Example 3 except that first silica nanoparticle coating formulation was coated using a Mayer bar (#6) instead of Mayer bar (#3) and the second metal nanoparticle coating formulation contained Cu nanopowder (25 nm, 0.40 g) instead of Cu nanopowder (40 nm, 0.40 g).

For Example 4 sample, the flux was 26.7±0.7 LMH/Bar and LRV was 6.97.

A control sample for Example 4 was prepared in the same manner as the control sample for Example 3.

For the control sample for Example 4, the flux was 115.6±3.0 LMH/Bar and LRV was 1.34.

Example 5

Cu NPs (580 nm) coated on top of silica nanoparticle coating on PES membrane Example 5 was prepared in essentially the same manner as Example 4 except that the second metal nanoparticle coating formulation contained Cu nanopowder (580 nm, 0.40 g) instead of Cu nanopowder (25 nm, 0.40 g).

For Example 5 sample, the flux was 26.4±0.2 LMH/Bar and LRV was 3.84.

Example 6

Ag NWs Coated on Top of Silica Nanoparticle Coating on PES Membrane

Example 6 was prepared in essentially the same manner as Example 4 except that the second metal nanoparticle coating formulation was an Ag nanowire ink (pH adjusted to 2-3) was hand coated as a second layer using Meyer rod (#3), dried and sintered at 85° C. in an oven for 15 min.

For Example 6 sample, the flux was 32.1±0.2 LMH/Bar and LRV was 2.68.

Example 7

Sputtering Deposited Au Coating on Silica Nanoparticle Coated PES

Example 7 samples were prepared in essentially the same manner as Example 2 described above except that a 10 nm thick coating on gold (Au) was applied instead of 10 nm thick coating of copper (Cu).

To deposit the 10 nm thick coating of gold, a 76.2 mm diameter round copper gold target placed 228.6 mm above the substrate was used. After the chamber was evacuated to $2 \times 10^{-5}$ torr ($2.67 \times 10^{-3}$ Pa) base pressure, argon was admitted inside the chamber and total pressure of the chamber was adjusted to 15 millitorr (2.0 Pa). Sputtering was achieved using a DC power supply at a constant power level of 0.30 kilowatts for 13.5 seconds to achieve 10 nm of Au layer.

The flux of the 10 nm thick Au coated Example 7 sample was 67.6±1.0 LMH/Bar and LRV was 2.00.

What is claimed is:

1. A multilayer article comprising:
    a) a microfiltration membrane substrate, the microfiltration membrane substrate having a first major surface;
    b) a first layer having a first major surface and a second major surface disposed opposite the first major surface, wherein the first major surface of the first layer is directly attached to the first major surface of the microfiltration membrane substrate, the first layer comprising a first polymeric binder and a plurality of acid-sintered interconnected first silica nanoparticles arranged to form a continuous three-dimensional porous network; and c) a second layer attached to the second major surface of the first layer, the second layer comprising: i) a metal coating having an average thickness of 5 nanometers to 20 nanometers, inclusive or ii) a composite coating comprising a second polymeric binder and at least one of metal nanoparticles or metal nanowires.

2. The multilayer article of claim 1, wherein the metal coating comprises a layer of at least one of copper, silver, gold, or platinum.

3. The multilayer article of claim 1, wherein the metal coating comprises a layer of copper.

4. The multilayer article of claim 1, wherein the composite coating comprises metal nanoparticles.

5. The multilayer article of claim 1, wherein the composite coating comprises metal nanowires.

6. The multilayer article of claim 1, wherein the at least one of metal nanoparticles or metal nanowires is independently selected from the group consisting of copper, silver, gold, and platinum.

7. The multilayer article of claim 1, wherein the metal coating has an average thickness of 10 nanometers to 20 nanometers, inclusive.

8. The multilayer article of claim 1, wherein the first polymeric binder and the second polymeric binder are independently selected from the group consisting of poly(vinyl alcohol) (PVA), a polysaccharide, a urethane resin, and an acrylate resin.

9. The multilayer article of claim 1, wherein an average thickness of the first layer and the second layer in combination ranges from 0.5 µm to 10 µm, inclusive.

10. The multilayer article of claim 1, wherein the multilayer article provides a log reduction value of at least 2.0 for a fluid containing a bacteriophage that is passed through the multilayer article under a constant flow rate of 1.0 mL/minute at 20-25 degrees Celsius in a sample cell.

11. A multilayer article comprising:
a) a microfiltration membrane substrate, the microfiltration membrane substrate having a first major surface;
b) a first layer having a first major surface and a second major surface disposed opposite the first major surface, wherein the first major surface of the first layer is directly attached to the first major surface of the microfiltration membrane substrate, the first layer comprising a first polymeric binder and a plurality of acid-sintered interconnected first silica nanoparticles arranged to form a continuous three-dimensional porous network; and
c) a second layer attached to the second major surface of the first layer, the second layer comprising a second polymeric binder, a plurality of metal nanoparticles or metal nanowires, and a plurality of second silica nanoparticles arranged to form a continuous three-dimensional porous network.

12. The multilayer article of claim 11, wherein the first silica nanoparticles and the second silica nanoparticles comprise at least some average particle size diameters that are different from each other.

13. The multilayer article of claim 11, wherein the first silica nanoparticles comprise average particle size diameters less than or equal to 250 nanometers (nm).

* * * * *